United States Patent [19]
Frangiudakis

[11] 3,789,962
[45] Feb. 5, 1974

[54] HYDRAULIC ACTUATOR FOR DUAL BRAKING SYSTEM

[75] Inventor: Emmanuel Frangiudakis, Athens, Greece

[73] Assignee: John W. Frangos, Beverly, Mass.

[22] Filed: May 25, 1972

[21] Appl. No.: 256,877

[52] U.S. Cl. .................. 188/345, 188/361, 188/364
[51] Int. Cl. .............................................. B60t 11/10
[58] Field of Search 188/345, 106 P, 364, 361, 362, 188/363; 60/54.6 M; 92/61

[56] References Cited
UNITED STATES PATENTS
3,068,964  12/1962  Williams et al. ................. 188/79.5 S
3,358,448  12/1967  Huffman .......................... 60/54.5 E
3,707,210  12/1972  Nyunoya et al. ..................... 188/345

*Primary Examiner*—George E. A. Halvosa
*Attorney, Agent, or Firm*—Gerald Altman et al.

[57] ABSTRACT

An actuating device is provided for use particularly with braking systems especially for automobiles, trucks and the like. The hydraulic actuator includes a pair of telescopic tubular cylinders having a common movable piston valve mounted for limited reciprocation therebetween. Each cylinder is connected to a separate hydraulic circuit either or both of which when pressurized will cause the cylinders to spread apart so as to actuate the braking mechanism. The device will actuate irrespective of failure of one of the hydraulic lines.

4 Claims, 3 Drawing Figures

PATENTED FEB 5 1974　3,789,962

HYDRAULIC ACTUATOR FOR DUAL BRAKING SYSTEM

BACKGROUND OF THE INVENTION

1. Field of the Invention

This invention relates generally to hydraulic actuators and more particularly is directed towards a double-acting hydraulic cylinder having fail-safe features for use particularly with braking systems.

2. Description of the Prior Art

In a conventional hydraulic braking system a hydraulic cylinder is mounted in working relationship to a movable brake shoe adapted to be brought into braking engagement with a drum or disc, depending upon the particular brake design. The hydraulic cylinder normally is connected directly to a brake pedal or, in a power assisted brake system, to various types of booster arrangements that are provided to increase the braking pressure without increasing the force required by the driver.

In order to improve the safety characteristics of the vehicle, braking systems have been incorporated with dual hydraulic circuits whereby braking action can be produced even though one hydraulic circuit should fail. While the double braking systems work effectively, the particular mechanisms employed have been rather complex, large and relatively expensive.

Accordingly, it is an object of the present invention to provide an improved hydraulic actuating mechanism for use particularly with a double hydraulic braking system. A further object of the invention is to provide a simple, low cost, hydraulic actuator having fail-safe design and one that is highly efficient and easily installed.

SUMMARY OF THE INVENTION

This invention features a hydraulic actuating mechanism, comprising a pair of tubular cylinders telescopically connected to one another with separate hydraulic conduits connected to opposite ends of the cylinders. A free piston is mounted to reciprocate within both cylinders to serve as a valve in the event of failure of one of the hydraulic circuits, preventing loss of hydraulic fluid from the other circuit and permitting the telescopic cylinders to reciprocate with respect to one another.

DETAILED DESCRIPTION OF THE PREFERRED EMBODIMENT

Figure 1:
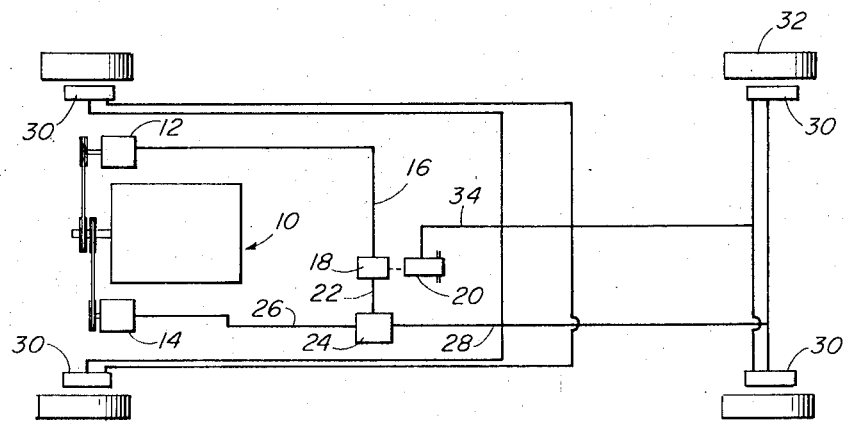
FIG. 1 is a schematic diagram of a power-assisted, dual hydraulic brake circuit for use with motor vehicles.

Referring now to the drawings and to FIG. 1 in particular, there is illustrated a typical power-assisted, dual hydraulic braking system such as commonly employed in automobiles, trucks, buses and other vehicles. In the illustrated system an engine 10 is drivingly connected by belts and pulleys to an air compresor 12 and a hydraulic pump 14. The air compressor 12 is connected by a conduit 16 to a valve 18 operated by means of a brake pedal 20. Depression of the brake pedal by the driver will admit air under pressure through a conduit 22 into an air-operated hydraulic valve 24 causing hydraulic pressure from the pump 14 to pass from a conduit 26 into a conduit 28 connected to four hydraulic actuators 30. One actuator 30 is located at each wheel 32 and each is adapted to operate the associated braking mechanism. The hydraulic circuit also includes a hydraulic conduit 34 connected to a conventional hydraulic device directly operated by the brake pedal 20 without power assist, whereby hydraulic pressure is manually applied to the four hydraulic actuators 30 by a separate hydraulic circuit.

Figure 2:
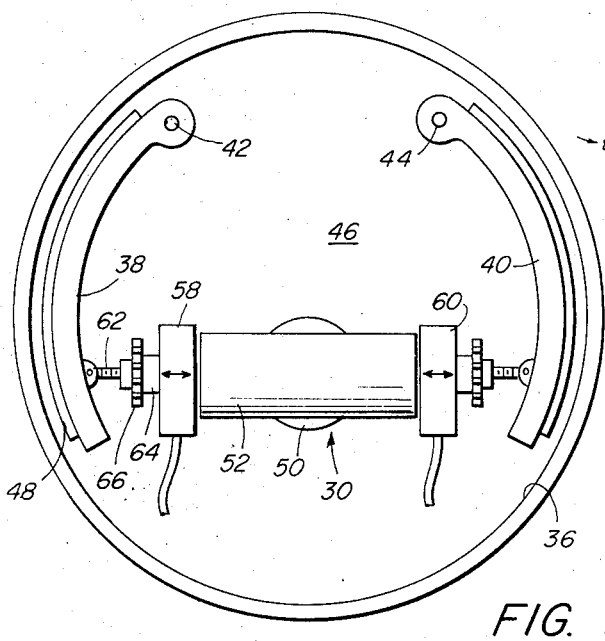
FIG. 2 is a detailed view in side elevation of a braking mechanism embodying the invention, and, FIG. 3 is a sectional view in side elevation of a hydraulic brake actuator made according to the invention.
Figure 3:
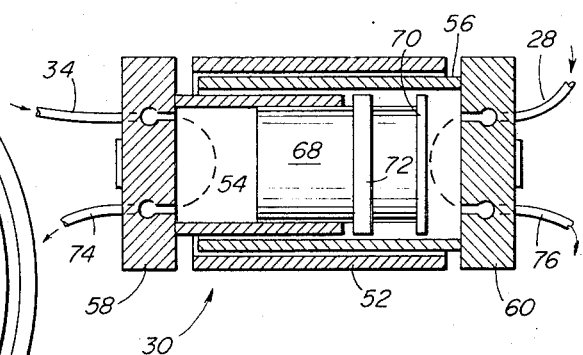

Referring now to FIG. 2 of the drawings, there is illustrated, in detail, a typical braking mechanism employing a hydraulic actuator 30 as disclosed herein. The braking mechanism of FIG. 2 is of the drum-type wherein an annular drum 36 usually of steel, aluminum or the like, is fixed to the wheel of the vehicle and turns with it. Mounted in close proximity to the inner face of the brake drum 36 are two arcuate brake shoes 38 and 40 pivoted to pins 42 and 44 mounted to a fixed hub 46. Each brake shoe is provided with brake lining 48 in the usual manner. The two brake shoes are pivoted into and out of braking engagement with the drum surface by means of the actuator 30 mounted by means of a bracket 50 to the hub 46. The bracket 50 includes a tubular housing 52 within which are mounted inner and outer tubular cylinders 54 and 56, respectively, telescopically connected to one another with each cylinder provided with a head 58 and 60. Each head is drivingly connected to the free end of its associated brake shoe by means of a threaded coupling 62 connected to the head by means of a rotatable nut 64 carrying an adjustment wheel 66. The wheel 66 may be manipulated from time to time in order to adjust the brake as the brake linings wear.

Mounted within the tubular cylinders 54 and 56 is a cylindrical valve piston 68 formed with an annular shoulder 70 at the right-hand end thereof and a medial shoulder 72 adapted to limit the left-hand motion of the piston while the shoulder 70 limits the right-hand motion thereof. Each cylinder head 58 and 60 is connected to a separate hydraulic circuit with the head 58 connected to the hydraulic conduit 34 while the head 60 is connected to the hydraulic conduit 28. Each head is provided with a return conduit 74 and 76, respectively.

In normal operation, when the pedal 20 is depressed, hydraulic pressure will be applied to both hydraulic circuits. Hydraulic pressure is thus applied to the conduit 28 as well as to the conduit 34 at each end of the actuator 30. When hydraulic pressure is applied to both conduits, the telescopic cylinders 54 and 56 will move axially apart to provide driving force against the two brake shoes which thereby engage the brake drum. When hydraulic pressure is relieved, the brake shoes return under the force of a spring (not shown). In the event that either of the hydraulic circuits should fail for any reaons, as for example by rupturing of a hydraulic conduit, the system will still be operative and there will be no loss of hydraulic fluid from the other part of the system. Assuming that the conduit 34 should rupture, hydraulic pressure applied to the conduit 28 will be fed into the head 60 and will force the piston 68 to the left causing the shoulder 72 to seat against the right-hand end of the cylinder 54, sealing against the cylinder 54 and the hydraulic pressure within the cylinder 56 will thus work against the piston 68 to force the two cylinders apart in the normal manner. No hydraulic fluid will leak from one cylinder to the other. Likewise, if the conduit 28 should rupture and the conduit 34 remains intact, pressur3e applied into the cylinder 54 will force the piston 68 to the right until the shoulder 70 bears against the head 60. The two shoulders seal tightly against the walls of the cylinder 56 so that no fluid within the cylinder 54 will be lost and the pressure within that cylinder will work against the piston 68 to force the cylinders apart in the usual fashion. Thus, the system remains operative irrespective of a failure of one of the conduits.

The unit is very small and compact with but three essential moving parts. It may be mounted in the space normally occupied by a conventional single action hydraulic actuator. The unit may be employed to advantage with a power-boosted system or with a conventional hydraulic system. It may be used with a brake drum type or with a disc type braking system or in any hydraulic mechanism requiring a dual hydraulic circuit and actuator.

Having thus described the invention what I claim and desire to obtain by Letters Patent of the United States is:

1. An actuator for use in a dual hydraulic braking system having movable brake members, comprising a. a pair of tubular cylinders telescopically and slidably connected to one another, the outside diameter of one cylinder substantially corresponding to the inside diameter of the other cylinder, said one cylinder being telescoped within the other cylinder,
   b. the inner ends of said cylinders being open and the outer ends being closed,
   c. an imperforate piston mounted for limited reciprocation within both of said cylinders,
   d. said piston being formed with a reduced portion at the end within the one smaller diameter cylinder and an enlarged annularly shouldered portion at the opposite end within said other larger diameter cylinder.

2. An actuator according to claim 1 including a bracket rigidly mounting one of said cylinders.

3. An actuator according to claim 1 in combination with a pair of pivotally mounted brake shoes drivingly connected to opposite ends of said cylinders.

4. An actuator according to claim 3 including adjustable screw means connecting the outer end of each cylinder to each of said shoes, said screw means including a threaded coupling mounted coaxially at the outer end of each cylinder for movement along the axis of said cylinders and a nut rotatably connected to each of said cylinders and threadably engaging each of said couplings for axial adjustment thereof.

* * * * *